United States Patent Office 3,148,156
Patented Sept. 8, 1964

3,148,156
PHTHALOCYANINE CATALYST REGENERATION
Robert C. Henry, Carpentersville, Ill., assignor to Universal Oil Products Company, Des Plaines, Ill., a corporation of Delaware
No Drawing. Filed Mar. 14, 1961, Ser. No. 95,467
10 Claims. (Cl. 252—420)

This invention relates to catalyst regeneration and more particularly to a novel method of regenerating phthalocyanine catalysts.

Phthalocyanine catalysts are used for the oxidation of sulfur and other oxidizable compounds. In one method the phthalocyanine is composited with a solid carrier and the solid composite is used as a fixed bed in a reaction zone. While the phthalocyanine catalyst is very active for catalyzing the oxidation reactions and the catalyst possesses a long life, the composite catalyst does become deactivated after use for considerable time. The present invention provides a novel method for effecting improved regeneration of the catalyst.

In one embodiment the present invention relates to a method of regenerating a composite of phthalocyanine catalyst and solid carrier which comprises treating said composite with $H_2O$ at an elevated temperature and thereafter impregnating with additional phthalocyanine catalyst.

As hereinbefore set forth, the phthalocyanine catalyst is used for the oxidation of sulfur compounds. In one embodiment the sulfur compounds include mercaptans which are contained in hydrocarbon distillates including cracked gasoline, straight run gasoline, natural gasoline or mixtures thereof, naphtha, jet fuel, kerosene, aromatic solvent, stove oil, range oil, fuel oil, lubricating oil, etc., as well as normally gaseous hydrocarbon fractions. Other sulfur compounds include $H_2S$, thiophenes, etc. These may be contained in hydrocarbon distillates or other organic fractions. In some cases the sulfur compounds may be recovered as concentrated fractions. Other organic fractions containing acidic components which may be oxidized in the presence of the phthalocyanine catalyst include, for example, fractions comprising alcohols, ketones, aldehydes, etc.

Regardless of the acidic components being oxidized, the catalyst comprises a composite of phthalocyanine catalyst and solid carrier. Any suitable phthalocyanine catalyst may be used and preferably comprises a metal phthalocyanine. Particularly preferred metal phthalocyanines comprise cobalt phthalocyanine and vanadium phthalocyanine. Other metal phthalocyanines include iron phthalocyanine, nickel phthalocyanine, cobalt phthalocyanine, molybdenum phthalocyanine, chromium phthalocyanine, etc. Still more preferably the metal phthalocyanine is utilized as a derivative thereof. A particularly preferred derivative is the sulfonated derivative. Thus, a particularly preferred phthalocyanine catalyst comprises cobalt phthalocyanine sulfonate. Such a catalyst is available commercially and comprises a mixture of cobalt phthalocyanine monosulfonate and disulfonate. In general, the monosulfonate is preferred. Another preferred catalyst comprises vanadium phthalocyanine sulfonate. These compounds may be obtained from any suitable source or may be prepared in any suitable manner as, for example, by reacting cobalt, vanadium or other metal phthalocyanine with fuming sulfuric acid. While the sulfonic acids are particularly preferred, it is understood that other suitable derivatives may be employed. Other derivatives include particularly the carboxylated derivatives which may be prepared, for example, by the action of trichloroacetic acid on the metal phthalocyanine or by the action of phosgene and aluminum chloride. In the latter reaction, the acid chloride is formed and may be converted to the desired carboxylated derivative by conventional hydrolysis.

The phthalocyanine catalyst is composited with a suitable adsorptive carrier. The carrier should be insoluble in or substantially unaffected by the caustic solution and hydrocarbons under the conditions prevailing in the treating zone. Activated carbon is particularly preferred because of its high adsorptivity and stability under these conditions. Other carbon carriers include coke, charcoal which may be obtained from any suitable source including bone char, wood charcoal, charcoal made from cocoanut or other nut shells, fruit pits, etc. Other solid carriers include silica as, for example, sand, glass beads, etc., clays and silicates including those synthetically prepared and naturally occurring, preferably acid, heat or otherwise treated as, for example, attapulgus clay, china clay, diatomaceous earth, feldspar, fuller's earth, halloysite, kaolin, kieselguhr, mica, montmorillonite, pumice, etc., aluminas and particularly alpha-aluminas including corundum, emery, etc., ceramics, porcelain, various magnesium compounds, titanium compounds, zirconium compounds, etc. The choice of the carrier will be made with reference to its adsorptive or spacing properties and to its stability in the alkaline reagent solution and sulfur compounds at the conditions prevailing in the treating zone.

The composite of phthalocyanine and carrier may be prepared in any suitable manner. In one method the carrier is formed into particles of uniform or irregular size and shape, including spheres, pills, pellets, rings, saddles, flakes, etc., and the particles are intimately contacted with a solution of the phthalocyanine catalyst. An alcoholic, aqueous, or alkaline solution of the phthalocyanine catalyst is prepared and, in a preferred embodiment, the carrier particles are soaked, dipped, suspended or immersed in the solution. In another method, the solution may be sprayed onto, poured over or otherwise contacted with the carrier.

In general it is preferred to use an aqueous solution of the phthalocyanine catalyst. In some cases solubility of the catalyst in water is facilitated by incorporating ammonia, ammonium hydroxide, sodium hydroxide or other alkaline material, generally in small amounts which usually will not be greater than 20% by volume of the aqueous medium. Excess solution may be removed in any suitable manner, and the carrier containing the catalyst is allowed to dry at room temperature, dried in an oven or by means of hot gases passed thereover, or in any other suitable manner. However, drying is not essential to the regeneration of the catalyst composite.

In general it is preferred to composite as much catalyst with the carrier as will form a stable composite, although a lesser amount may be so deposited, if desired. In one preparation, 1% by weight of cobalt phthalocyanine sulfonate catalyst was composited with activated carbon by soaking granules of the carbon in a solution of the phthalocyanine catalyst. In another method, the carrier is deposited as a fixed bed in a reaction zone and the phthalocyanine catalyst solution is passed therethrough in order to form the catalyst composite in situ. If desired, the solution may be recycled one or more times in order to prepare the desired composite. In still another embodiment the carrier may be deposited in a reaction zone and the zone then is filled with a solution of the catalyst, thereby forming the composite in situ.

As hereinbefore set forth, oxidation is effected in the presence of the composite of phthalocyanine catalyst and carrier. The composite is utilized as a fixed bed in a reaction zone, and the fraction to be oxidized is contacted with the catalyst at the desired operating conditions. In many cases it is desirable to use a packing material in the reaction zone and, in accordance with the present invention, the fixed bed of solid composite serves the dual purpose of providing a catalyst required for the oxidation and also to provide the desired packing material. In another embodiment, the solid catalyst composite may be utilized as a slurry in the hydrocarbon distillate or other fraction being treated, in the caustic solution when used in the process, or in any other suitable liquid, and carried into and, in some cases, out of the treating zone in this manner.

In one embodiment the oxidation reaction is effected in the presence of an alkaline reagent solution. For example, purification of sour distillate is accomplished by reacting mercaptans contained in said distillate with oxygen to convert the mercaptans into disulfides. This reaction preferably is effected in the presence of an alkaline reagent solution which is passed together with the hydrocarbon distillate into contact with the catalyst. Any suitable alkaline reagent solution may be used and preferably comprises an aqueous caustic solution (sodium hydroxide). Other suitable alkaline solutions may be employed and particularly potassium hydroxide. Still other alkaline solutions include lithium hydroxide, rubidium hydroxide and cesium hydroxide. Similarly, while water is the preferred solvent for the alkaline reagent, it is understood that other solvents may be employed including, for example, alcohols and particularly methanol, ethanol, propanol, butanol, etc., ketones including acetone, methylethyl ketone, etc. In some cases the oxidation is effected in the presence of both an aqueous solution of the alkaline reagent and an alcohol, particularly methanol or ethanol, or other solutizers or solubilizers including, for example, phenols, cresols, butyric acid, etc.

As hereinbefore set forth, purification of hydrocarbon distillates is effected by oxidation of mercaptans to disulfides. Accordingly, the reaction is effected in the presence of an oxidizing agent and preferably air, although oxygen or other oxygen-containing agents may be employed. The mixture of hydrocarbon distillate, alkaline reagent and oxidizing agent is passed upwardly or, when desired, downwardly, through the bed of catalyst composite. In some cases the air may be passed countercurrently to the hydrocarbon distillate. In still other cases the hydrocarbon distillate and alkaline solution may be introduced separately into the treating zone.

In many cases sour hydrocarbon distillate, and particularly gasoline, is first treated with an alkaline reagent solution in order to remove a major portion of the mercaptans prior to further treating in the manner hereinbefore described. Any suitable alkaline reagent, and particularly sodium hydroxide or potassium hydroxide, solution is utilized. This removes a major portion of the mercaptans but still leaves a distillate which is sour. Further conversion of the mercaptans is effected in the presence of the fixed bed catalyst herein described.

Subsequent to the extraction of mercaptans, an alkaline reagent solution containing the mercaptans as mercaptides is subjected to regeneration. In a preferred operation, this regeneration is effected by oxidation in the presence of a suitable catalyst to regenerate the alkaline metal hydroxide and to form disulfides. As another advantage to the catalyst composite of the present invention, regeneration of the used alkaline solution is effected in the presence of this catalyst and air, oxygen or other suitable oxidizing agent.

Oxidation is effected in any suitable temperature and pressure. In most cases ambient temperature is satisfactory. Elevated temperature which generally will not exceed about 400° F. may be employed. Atmospheric pressure usually is employed, although superatmospheric pressures up to 1000 pounds per square inch or more may be employed. The time of contact in the oxidation zone will be selected to give the desired oxidation and may range from a liquid hourly space velocity of 1 up to 100 or more, depending upon the size of the oxidation zone, the amount of catalyst and the particular fraction being treated.

As hereinbefore set forth, the solid composite of phthalocyanine catalyst and carrier is very effective for catalyzing the oxidation reaction. However, after a period of time, the catalyst becomes deactivated. In accordance with the present invention improved regeneration is effected by contacting the catalyst with $H_2O$ at elevated temperature and then reimpregnating with additional phthalocyanine catalyst. Treatment with $H_2O$ at elevated temperature includes washing the catalyst with hot water, soaking the catalyst in hot water, boiling the catalyst in water, passing steam through the catalyst, etc. Washing or soaking the catalyst in hot water is effected with water at a temperature above about 150° F. and preferably above about 180° F. and may be as high as the critical temperature provided sufficient pressure is employed to maintain liquid state. In one embodiment hot water is passed continuously through the catalyst composite, withdrawn from the zone, reheated and recycled. In another embodiment the reaction zone containing the catalyst composite is filled with hot water and the catalyst treated in this manner. Preferably some means of maintaining the elevated temperature of the water is used and may comprise circulating the water with intervening reheating as mentioned above or supplying heat to the zone containing the catalyst either by internal or external heating elements. In another embodiment the water is kept in a state of boiling. In still another method, the catalyst is subjected to steaming.

In large scale operations, treating with $H_2O$ preferably is effected in situ; that is, in the reactor in which the catalyst composite is disposed and used in the oxidation process. In some cases, however, advantages may appear for withdrawing the catalyst from the reaction zone and effecting the treatment with $H_2O$ at elevated temperature in a separate zone, particularly a zone equipped with stirring means. This outside zone also may contain heating coils internally or externally in order to maintain the desired temperature and/or pumps for recirculating the water, preferably with intervening heating.

The time of treatment with $H_2O$ at elevated temperature generally will range from 2 to 48 hours or more and preferably from 4 to 16 hours. The particular time of treatment will vary with the state of deactivation of the composite catalyst. In some cases advantages may appear for both washing with water at an elevated tempearture and then steaming the catalyst, or the reverse procedure may be used.

Following the treatment with $H_2O$ at elevated temperature, the composite, either with or without intervening drying, is then reimpregnated with phthalocyanine catalyst. Reimpregnation of the catalyst may be effected in substantially the same manner as heretofore described in connection with the preparation of the original catalyst. Here again it is desired to deposit as much active catalyst as will form a stable composite although, a lesser amount of active catalyst may be composited if desired.

As will be shown by the examples appended to the present specifications, the combination of treating with $H_2O$ at elevated temperature and reimpregnation serves to effectively regenerate the catalyst and produces a catalyst which is more effective than is obtained by reimpregnation without prior treating with $H_2O$ at elevated temperature. Also, this combination produces a regenerated catalyst of greater activity than is obtained by treating with $H_2O$ at elevated temperature but without reimpregnation.

The following examples are introduced to illustrate further the novelty and utility of the present invention but not with the intention of unduly limiting the same.

*Example I*

A composite of cobalt phthalocyanine sulfonate on activated carbon was prepared as follows: The carbon is a commercially available product marketed under the trade name of "Nuchar Type WA" and is supplied in granules of 30–40 mesh. It is stated that the carbon is formed from residual organic material which is recovered during the manufacture of pulp and then is carbonized and activated by heating. A small scale preparation was made by dissolving 0.15 gram of cobalt phthalocyanine sulfonate in 25 cc. of water, to which 1 cc. of ammonium hydroxide (28%) solution was added. 100 cc. of water then was added thereto and the mixture was stirred. 15 grams (100 cc.) of the activated carbon granules were poured into the solution, stirred slightly and allowed to stand overnight. The following day, the mixture was filtered to separate excess water. 41.9 grams of solid material were recovered and were dried under water pump vacuum to leave a dry composite of 15.2 grams. The filtrate was a faint blue color but was analyzed and found to contain no cobalt. Accordingly, the final catalyst composite contained 1% by weight of the phthalocyanine catalyst.

*Example II*

A catalyst prepared in substantially the same manner as described in Example I was utilized both for the regeneration of caustic solution used to extract mercaptans from a mixture of cracked and straight run gasoline and also for effecting final sweetening of the extracted gasoline. The extraction was effected at a temperature of about 100° F. using caustic solution of 25° Bé. The gasoline charge contained 0.03% by weight of mercaptans and was reduced to 0.01% by weight in the extraction step. The caustic solution containing the mercaptans then was oxidized with air in the presence of a solid composite of cobalt phthalocyanine sulfonate-charcoal catalyst. Oxidation was effected at a temperature of about 130° F. and the regenerated caustic solution was reused to extract mercaptans from additional quantities of the mixed gasoline charge.

The gasoline from the extraction zone was passed, together with air and 25° Bé. caustic, through a reaction zone containing another bed of the solid composite catalyst to effect oxidation of the mercaptans still contained in the gasoline. The treated gasoline is sent to storage and is now sweet.

*Example III*

After use in the above manner, the composite catalysts used in both the caustic regeneration and in the final gasoline treating become deactivated. In accordance with the present invention these catalysts are separately washed with hot water for 6 hours and then are steamed for 4 hours, after which a separate aqueous solution of cobalt phthalocyanine sulfonate is circulated through the composite catalysts to effect reimpregnation thereof.

*Example IV*

A sample of catalyst used in substantially the same manner as described in Example II was divided into several portions and each portion was separately treated.

The different catalyst samples were evaluated in the laboratory by comparing the degree of sweetening effected in comparison with the degree of sweetening effected under the same conditions with a standard fresh catalyst.

A sample of the spent catalyst as received had an activity rating of 8%. Another sample of the same catalyst was washed with hot water and steamed for 4 hours and, after such treatment, had an activity rating of 18%. A third sample of the catalyst was reimpregnated with cobalt phthalocyanine sulfonate and had a catalyst rating of 35%. In contrast, a fourth sample of the catalyst was washed with hot water and steamed for 4 hours and then reimpregnated with cobalt phthalocyanine sulfonate. This catalyst had an activity rating of 50%.

From the above data it will be seen that the catalyst which was washed, steamed and reimpregnated had an activity rating of 50%, which is considerably higher than is obtained by either washing and steaming or reimpregnation alone.

*Example V*

Another spent composite catalyst was evaluated in the same manner as described in Example IV. In this case the spent catalyst as received had an activity rating of 5%. After steaming for 4 hours, the activity was raised to only 9%. Reimpregnation without steaming gave an activity rating of 39%. However, both steaming for 4 hours and reimpregnation produced a catalyst of 48% activity. Here again, it will be noted that both steaming and reimpregnation regenerated the catalyst to a higher activity than was obtained by either method alone.

I claim as my invention:

1. A method of regenerating a composite of a solid carrier and a metal phthalocyanine catalyst in which the metal is selected from the group consisting of cobalt, vanadium, iron, nickel, molybdenum and chromium, which comprises contacting said composite with $H_2O$ at a temperature above about 150° F. for a period of from about 2 to about 48 hours and thereafter reimpregnating with an additional quantity of said metal phthalocyanine catalyst.

2. The method of claim 1 wherein said contacting is effected by washing said composite with hot water.

3. The method of claim 1 wherein said contacting is effected by steaming said composite.

4. A method of regenerating a composite of a solid carrier and a metal phthalocyanine sulfonate catalyst in which the metal is selected from the group consisting of cobalt, vanadium, iron, nickel, molybdenum and chromium, which comprises contacting said composite with hot water at a temperature above about 150° F. for a period of from 2 to 48 hours and thereafter reimpregnating with an additional quantity of said metal phthalocyanine sulfonate catalyst.

5. The method of claim 4 wherein said reimpregnation is effected by circulating an aqueous solution of said additional quantity of phthalocyanine sulfonate catalyst through said composite.

6. A method of regenerating a composite of cobalt phthalocyanine sulfonate catalyst and activated carbon which comprises contacting said composite with hot water at a temperature above about 150° F. for a period of from 2 to 48 hours and thereafter reimpregnating with additional cobalt phthalocyanine sulfonate catalyst.

7. A method of regenerating a composite of cobalt phthalocyanine monosulfonate catalyst and charcoal which comprises contacting said composite with hot water at a temperature above about 150° F. for a period of from 4 to 16 hours and thereafter reimpregnating with additional cobalt phthalocyanine monosulfonate catalyst.

8. A method of regenerating a composite of vanadium phthalocyanine monosulfonate catalyst and charcoal which comprises contacting said composite with hot water at a temperature above about 150° F. for a period of from 4 to 16 hours and thereafter reimpregnating with additional vanadium phthalocyanine monosulfonate catalyst.

9. A method of regenerating a composite of cobalt phthalocyanine carboxylate catalyst and charcoal which comprises contacting said composite with hot water at a temperature above about 150° F. for a period of from 4 to 16 hours and thereafter reimpregnating with additional cobalt phthalocyanine carboxylate catalyst.

10. A method of regenerating a composite of vanadium phthalocyanine carboxylate catalyst and charcoal which comprises contacting said composite with hot water at a temperature above about 150° F. for a period of from 4 to 16 hours and thereafter reimpregnating with additional vanadium phthalocyanine carboxylate catalyst.

References Cited in the file of this patent

UNITED STATES PATENTS

| | | |
|---|---|---|
| 2,403,052 | Cole et al. | July 2, 1946 |
| 2,543,070 | Shabaker | Feb. 27, 1951 |
| 2,640,009 | Montgomery et al. | May 26, 1953 |
| 2,882,224 | Gleim et al. | Apr. 14, 1959 |
| 2,981,771 | Brant et al. | Apr. 25, 1961 |
| 2,987,486 | Carr | June 6, 1961 |